G. F. RAUCH.
MEAT TENDERER.
APPLICATION FILED FEB. 13, 1915.
1,196,980.                                  Patented Sept. 5, 1916.
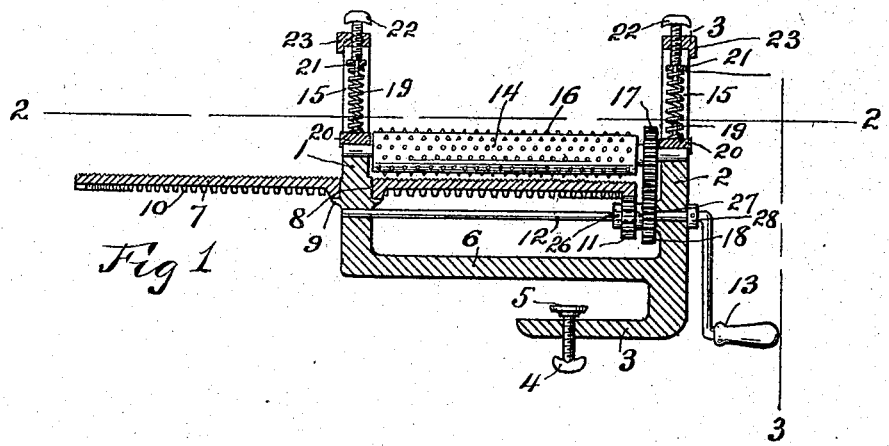
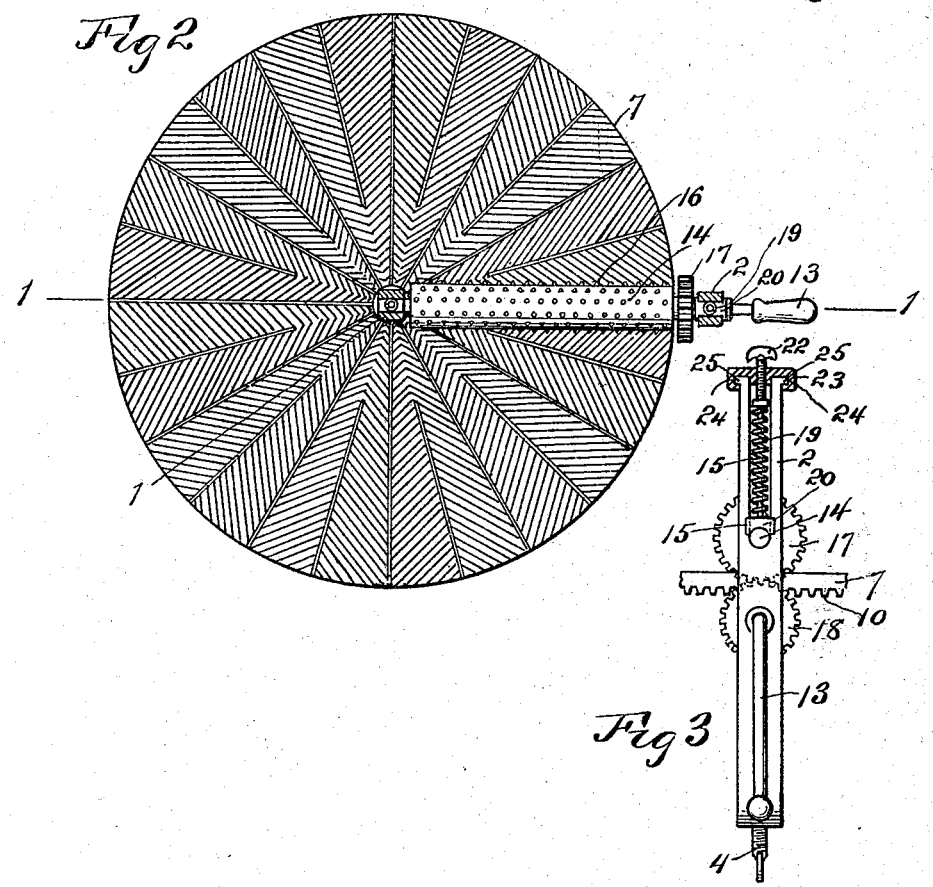
WITNESSES:
R. E. Hamilton
E. B. House
INVENTOR.
George F. Rauch
BY Warren D. House
His ATTORNEY.

UNITED STATES PATENT OFFICE.

GEORGE F. RAUCH, OF PLATTE, SOUTH DAKOTA.

MEAT-TENDERER.

1,196,980.　　　　　　　Specification of Letters Patent.　　Patented Sept. 5, 1916.

Application filed February 13, 1915. Serial No. 7,954.

*To all whom it may concern:*

Be it known that I, GEORGE F. RAUCH, a citizen of the United States, residing at Platte, in the county of Charles Mix and State of South Dakota, have invented a certain new and useful Improvement in Meat-Tenderers, of which the following is a specification.

My invention relates to improvements in meat tenderers.

The object of my invention is to provide a meat tenderer, adapted for mangling beef steak or other sliced meat so as to make it tender and prepare it for cooking, which is simple in construction, durable, efficient in operation, which may be readily taken apart and cleaned, which may be economically manufactured and which may be quickly attached to or detached from a suitable support, such as a table.

The novel features of my invention are hereinafter fully described and claimed.

In the accompanying drawings which illustrate the preferred embodiment of my invention, Figure 1 is a vertical sectional view of my improved meat tenderer taken on the line 1—1 of Fig. 2. Fig. 2 is a horizontal sectional view on the line 2—2 of Fig. 1. Fig. 3 is a vertical sectional view on the line 3—3 of Fig. 1.

Similar reference characters designate similar parts in the different views.

The improved meat tenderer is provided with a U-shaped support provided with two vertical arms 1 and 2, and having extending downwardly and inwardly from one end of its transverse portion a right-angled arm 3, the horizontal portion of which is provided with a vertical screw-threaded hole in which is fitted a thumb screw 4 having mounted on its upper end a rotatable washer 5, which is adapted to bear against the under side of a table, not shown, when the transverse portion 6 of the support is mounted upon the top of the table.

A horizontal meat supporting member comprising, preferably, a disk 7, is provided with a central vertical hole through which extends the arm 1, the latter being provided with a cylindrical portion 8 on which the disk 7 is rotatable, the latter being centrally supported by means of an annular flange or shoulder 9 on the arm 1. The under side of the meat supporting member 7 is provided with an annular concentric row of teeth 10, preferably disposed adjacent to the edge of said member and engaging with a spur gear wheel 11 which is secured to a horizontal shaft 12, which is rotatably mounted in transverse holes provided in the arms 1 and 2. The shaft 12 at one end is provided with a crank handle 13 by which it may be turned. If desired, the upper side of the meat supporting member 7 may be roughened.

A mangling member comprising, preferably, a horizontal roller 14, has its ends respectively rotatably mounted in vertical slots 15 which are provided one in each arm 1 and 2. The mangling member or roller 14 is preferably provided with peripheral mangling teeth 16, and said roller is disposed radially above and adapted to coöperate with the meat supporting member 7, with respect to which the roller is vertically movable in the slots 15. Respectively secured on the roller 14 and shaft 12 are spur gear wheels 17 and 18 which mesh with each other, whereby rotation is transmitted to the roller 14 from the crank shaft 12.

For yieldingly normally forcing the roller 14 toward the meat supporting member 7, I provide two coil springs 19, the lower ends of which respectively bear against the upper sides of two bearing members 20, respectively mounted in the slots 15 and respectively supported upon the reduced ends of the roller 14. The upper ends of the coil springs 19 respectively support two washers 21, which are respectively rotatably mounted on the reduced lower ends of two thumb screws 22, which are respectively fitted in vertical holes provided in two caps 23, which are respectively mounted upon the upper ends of the arms 1 and 2. As shown in Fig. 3, each cap 23 is provided with two horizontal grooves 24 which extend inwardly from one side only of the cap, and which are adapted to respectively receive two lateral flanges 25, which are provided at opposite sides respectively of each arm 1 and 2 at the upper end thereof. By adjusting the thumb screws 22, the springs 19 may be made to exert the desired downward pressure upon the roller 14 through the intermediacy of the bearing members 20.

In the operation of my invention, the machine is clamped to a table by having the transverse portion 6 rest upon the top thereof and the arm 3 disposed below the top, after which the clamping screw 4 is adjusted so as to have the washer 5 tightly bear against the under side of the table, not shown. The steak or other meat which is to be made tender, is then placed upon the meat supporting member 7, after which the crank handle 13 is turned, thereby simultaneously rotating the roller 14 and the meat supporting member 7, whereby the meat is brought under the mangling roller 14, the teeth 16 of which penetrate and mangle the meat. The arrangement of the gearing is such that the adjacent surfaces of the roller 14 and member 7 travel in the same direction, the outer portion of the member 7 traveling at substantially the same speed as the peripheral speed of the roller 14, while the inner portion of the member 7 travels at a lower rate of speed, thereby assisting in the mangling of meat owing to the different rate of speed of the two members, which is due to the radial disposition of the roller 14. If a large bone in the meat strikes the roller 14, the crank handle 13 may be reversed, thereby running the meat between the roller 14 and member 7 in the opposite direction. If the meat is sufficiently thick to lift the roller 14 to such a height that the gears 17 and 18 disengage with each other, nevertheless, the roller 14 will be driven by the contact it has with the meat. This vertical movement of the roller 14 also serves to eliminate any danger of the gears or any other part of the machine being broken in case that a large bone passes under the roller. The gear 11 is preferably arranged to serve as a support, as well as a driving means for the meat supporting member 7, the teeth of the gear being adapted to bear against the under side of said member 7. The parts may be disassembled by relieving the pressure of the springs 19 and sliding the caps 23 laterally from the arms 1 and 2, after which the roller 14 and bearing members 20 may be slipped out of the slots 15, which extend to the upper ends of the arms 1 and 2 respectively. The member 7 may then be slipped upwardly off from the arm 1. The gears 11 and 18 may be releasably secured to the shaft 12 by set screws 26 and 27. A removable collar 28 may be secured to the shaft 12 at the outer side of the arm 2, to prevent inward sliding of the shaft. By loosening the collar 28 and set screws 26 and 27, the shaft 12 may be withdrawn from the arms 1 and 2 and the gears 11 and 18 for cleaning purposes.

I do not limit my invention to the structure shown and described, as modifications, within the scope of the appended claim, may be made without departing from the spirit of my invention.

What I claim is:—

In a meat tenderer, a support, a meat supporting member rotatable thereon on a vertical axis and provided with a roughened upper side, a cylindrical mangling member disposed above and adjacent to and radially relatively to said meat supporting member and rotatively mounted in said support, and provided on its periphery with relatively short teeth, and means for simultaneously rotating the meat supporting member and the mangling member.

In testimony whereof I have signed my name to this specification in presence of two subscribing witnesses.

GEORGE F. RAUCH.

Witnesses:
JOHN H. CRUMB,
F. C. SMITH.

Copies of this patent may be obtained for five cents each, by addressing the "Commissioner of Patents, Washington, D. C."